Patented Mar. 10, 1953

2,631,111

UNITED STATES PATENT OFFICE 2,631,111

GLUTEN TREATMENT

Walter G. Meyer, Decatur, Ill., assignor to A. E. Staley Manufacturing Company, Decatur, Ill., a corporation of Delaware No Drawing. Application September 29, 1950, Serial No. 187,663.

4 Claims. (Cl. 127—69)

This invention relates to the treatment of corn gluten and more specifically to such a treatment whereby the protein content of the gluten is increased.

In the corn wet milling process, the starch is separated from the protein in a series of operations, the object of which is to reduce the protein content of the starch fraction and to reduce the starch content of the protein fraction. The protein fraction recovered, commonly referred to as gluten, may contain about 60 to 70% protein, with an average figure being around 65%, depending upon the efficiency of the separation procedures. The balance of the material consists mainly of starch and non-starch carbohydrates, such as fiber.

This gluten is recovered as a solid by the filtration or centrifuging of water slurries in which the gluten is suspended. The gluten content of these slurries varies considerably, depending upon the type of process and apparatus which is used in the wet milling process. The gluten filtration is a rather difficult operation, since the filtering medium tends to become clogged, perhaps due to the colloidal or gelatinous nature of some of the solids present. Any practical treatment which would improve the filterability or separability of this mixture would be highly desirable since it would reduce the cost of this operation.

Among various attempts to improve the filterability and raise the protein content of the gluten was that of heating the gluten to various degrees, even up to boiling. This heating was performed in open containers, the resulting evaporation of water being unobjectionable, in fact desirable, since it resulted in decreasing the water content of the slurry. These attempts were unsuccessful, however, regardless of how long the heating was continued, since the slurry actually became more difficult to filter than it was before. This was apparently due to the pasting of the starch or some modification of the protein, which resulted in a blinding of the filtration medium. Centrifuging was also unsuccessful. Various other attempts were made to overcome this and associated problems, but no satisfactory, economical and feasible process was ever developed.

One of the objects of this invention is to provide a method for treating gluten which increases its separability or filterability.

Another object of this invention is to provide a method of treating gluten which will increase the protein content and decrease the carbohydrate content.

Other objects will appear from reading the following description of this invention.

It has been unexpectedly discovered that the foregoing objects of this invention can be realized by heating a gluten slurry at a temperature substantially in excess of 212° F. for a relatively short period of time, which can be readily effected by heating the slurry under superatmospheric steam pressure in a vessel of appropriate design. The vessel may be provided with a steam injector, steam jacket or steam coils, or other means whereby the heating can be accomplished through the use of high pressure steam. Other heating means may also be used. The temperature to which the gluten slurry is heated and the length of time of heating were found to be interdependent factors. That is, at higher temperatures the heating time can be relatively short, whereas at lower temperatures the gluten slurry must be heated for longer periods of time.

For example, it was found that the object of this invention can be realized by heating the gluten for five minutes at 312° F. (about 80 p. s. i. a. (pounds per square inch absolute)). However, only about two minutes heating time were required at 350° F. (about 135 p. s. i. a.). At a temperature of about 260° F. (35 p. s. i. a.), it was found that the gluten must be heated for at least about twenty minutes to obtain improved results. At this lower temperature, it was preferable to heat for at least about thirty minutes in order to insure fairly satisfactory results. At progressively lower temperatures, the reaction becomes gradually and impractically slower. A practical method is to heat at around 310° F. for about ten minutes. The preferred operating range, based mainly on steam economy and equipment cost, is about 280 to 360° F. (about 50 to 150 p. s. i. a.). The time of heating needed to obtain the degree of modification required can be quickly established by removing samples at predetermined time intervals during the process, filtering, or centrifuging them and examining the recovered solids. Tests show that improvements in separability of the gluten from the slurry can be realized by using vacuum or high pressure filtration, centrifuging or settling.

The gluten slurry may be heated for longer periods of time without doing appreciable damage, but since this heating is expensive, it will normally be desirable to end the heating operation as soon as the slurry has been treated sufficiently to make it easily filterable.

A corn gluten slurry as encountered in the wet milling process ordinarily has a pH in the range of about 4.0 to 4.5. The treatment here described causes the pH to rise about one-tenth of a pH unit. This is probably due to the evaporation of volatile acids, or acid anhydrides such as sulphur dioxide.

This invention is adaptable to the treatment of gluten slurries varying over a wide range of density, which is commonly expressed as ounces of gluten per gallon. This expression really covers the total insoluble solids per gallon. Gluten slurries varying from 4 to 22 ounces of gluten per gallon have been successfully treated according to the invention. However, it is better to process high density solutions because less steam is required per unit weight of gluten and there is less water to handle.

The starch content of the gluten slurry may vary over a wide range. Should the starch-gluten separation processes be operating inefficiently, the protein content of the slurry may drop to 60% or 50% or even lower, but this process operates equally well on these slurries. It also operates on gluten slurries of unusually high protein content. In general, however, better results are obtained by operating with a slurry which is high in protein content. However, the higher the carbohydrate, the more the protein content of the cake is enriched due to the removal by this treatment of the non-protein fraction.

A small proportion of the protein is solubilized by this treatment, as shown by a study of the nitrogen balance. This loss increases slightly with increasing time and temperature of treatment, but does not exceed about 8% in any case. This solubilized protein goes into the filtrate, of course, which may be concentrated by evaporation and used as an ingredient of animal feed.

The following are examples of the use of this invention in the treatment of corn gluten:

Example 1

A gluten slurry was used containing 17 oz. of "gluten" solids per gallon. As a control run, this slurry was not heated, but passed directly to a vacuum filter. The filtration rate was 1.1 volumes per minute. The gluten cake had a protein content of 72.4% on a dry substance basis. When another portion of this same slurry was boiled at 212° F., it was found that it would not pass through a vacuum filter.

Example 2

Another portion of the same gluten slurry as used in Example 1 was heated at 260° F. by steam injection, samples being removed at intervals and then vacuum filtered while hot. The results were as follows:

| Sample No. | Minutes heated | Filtration rate, vols./min. | Percent Protein in cake, D. S. B. |
|---|---|---|---|
| 1 | 10 | 1.2 | 73.1 |
| 2 | 20 | 2.3 | 74.0 |
| 3 | 30 | 3.5 | 75.3 |
| 4 | 60 | 11 | 77.6 |

Example 3

Another portion of the same slurry as used in Example 1 was heated at 310° F. and sampled at intervals, with the following results:

| Sample No. | Minutes heated | Filtration rate, vols./min. | Percent Protein in cake, D. S. B. |
|---|---|---|---|
| 1 | 2 | 2.0 | 73.5 |
| 2 | 5 | 63 | 77.0 |
| 3 | 10 | 67 | 77.6 |
| 4 | 20 | 83 | 80.8 |

Example 4

Another portion of the same slurry as used in Example 1 was heated at 350° F. and sampled at intervals, with the following results:

| Sample No. | Minutes heated | Filtration rate, vols./min. | Percent Protein in cake, D. S. B. |
|---|---|---|---|
| 1 | 2 | 28 | 76.9 |
| 2 | 5 | 64 | 77.5 |
| 3 | 10 | 76 | 80.9 |
| 4 | 20 | 80 | 81.0 |

Example 5

Another portion of the same slurry as used in Example 1 was heated at 360° F. for three minutes. It gave a filtration rate of 75 vols./min. and the cake had a protein content of 78.7%.

Example 6

A 13 oz./gal. gluten slurry was used in a control run and two runs at about 287° F. (55 p. s. i. a.), then filtering through a filter press at 90 p. s. i. g.:

| Sample No. | Minutes heated | Filtration rate, gals./sq. ft./hr. | Percent Protein in cake, D. S. B. |
|---|---|---|---|
| 1 | 0 | 0.71 | 67.9 |
| 2 | 5 | 1.81 | 72.7 |
| 3 | 15 | 5.68 | 77.9 |

Example 7

A 11 oz./gal. gluten slurry was used in a control run and two runs at about 312° F. (80 p. s. i. a.), then filtering through a filter press at 90 p. s. i. g.:

| Sample No. | Minutes heated | Filtration rate, gals./sq. ft./hr. | Percent Protein in cake, D. S. B. |
|---|---|---|---|
| 1 | 0 | 0.76 | 71.7 |
| 2 | 5 | 6.87 | 73.0 |
| 3 | 10 | 8.24 | 78.0 |

Example 8

A 15 oz./gal. gluten slurry was used in a control run and one run at about 338° F. (115 p. s. i. a.), then filtering through a filter press at 90 p. s. i. g.:

| Sample No. | Minutes heated | Filtration rate, gals./sq. ft./hr. | Percent Protein in cake, D. S. B. |
|---|---|---|---|
| 1 | 0 | 0.68 | 70.2 |
| 2 | 1 | 2.26 | 77.1 |

This invention possesses many advantages, among which are the following:

1. —Faster filtration.
2. —Increase in protein content of the gluten.
3. —Less starch in the gluten.
4. —Lighter weight filter cloth may be used.
5. —The filter cake may be more easily washed.
6. —Filter press is easier to empty and clean.
7. —The filter cake is less sticky, crumbles more readily and is easier to dry.
8. —The filter cake retains less water at a given pressure.

The foregoing description of this invention is intended to be illustrative only. Variations will be obvious to those skilled in the art. For example, while this description has largely referred to the improvement in filterability resulting from the practice of this invention, it is obvious that the same advantages accrue to other means of separation, such as centrifuging and settling, and it is intended that such equivalents are covered by the claims.

What is claimed as new is:

1. The process of treating corn gluten slurry containing insoluble protein and non-protein solids, to increase the separability and the protein content of said solids, comprising heating said slurry under superatmospheric pressure at a temperature substantially in excess of 212° F. at which said separability and said protein content are suitably increased, and then separating the solids.

2. The process of claim 1 wherein said pressure is in excess of about 35 pounds per square inch absolute, corresponding to about 260° F.

3. The process of claim 1 wherein said pressure is in the range of about 50 to 150 pounds per square inch absolute, corresponding to about 280 to 360° F.

4. In the corn wet milling process, wherein gluten solids are separated from the gluten slurry, the improvement comprising heating said slurry under superatmospheric pressure at a temperature substantially in excess of 212° F. at which said separability is suitably increased, and then separating the solids.

WALTER G. MEYER.

REFERENCES CITED

The following references are of record in the file of this patent:

UNITED STATES PATENTS

| Number | Name | Date |
|---|---|---|
| 260,736 | Becker | July 11, 1882 |
| 2,274,004 | Shildneck | Feb. 24, 1942 |
| 2,368,668 | Langford et al. | Feb. 6, 1945 |
| 2,442,789 | Walsh | June 8, 1948 |
| 2,536,430 | Eckers | Jan. 2, 1951 |